United States Patent [19]

Wienkop

[11] Patent Number: 5,422,888
[45] Date of Patent: Jun. 6, 1995

[54] METHOD FOR MULTIPLEXING CELLS INTENDED FOR A PLURALITY OF RECEIVERS ONTO A TRANSMISSION LINE CONNECTED TO THE RECEIVERS

[75] Inventor: Uwe Wienkop, München, Germany

[73] Assignee: Siemens Aktiengesellschaft, Munich, Germany

[21] Appl. No.: 196,171

[22] PCT Filed: Aug. 3, 1992

[86] PCT No.: PCT/DE92/00641
§ 371 Date: Feb. 15, 1994
§ 102(e) Date: Feb. 15, 1994

[87] PCT Pub. No.: WO93/04542
PCT Pub. Date: Mar. 4, 1993

[30] Foreign Application Priority Data

Aug. 22, 1991 [DE] Germany .......... 41 27 780.5

[51] Int. Cl.⁶ ............................. H04J 3/24
[52] U.S. Cl. ............................. 370/94.1; 370/60
[58] Field of Search ............... 370/60, 94.1, 58.1, 370/58.3, 77, 79, 94.1, 84, 95.1, 85.7, 85.1, 85.2, 85.3, 85.6

[56] References Cited

U.S. PATENT DOCUMENTS 4,742,513 5/1988 Reichard, Jr. et al. .......... 370/112
5,132,966 7/1992 Hayano et al. .......... 370/79
5,187,707 2/1993 Chu et al. .......... 370/79

FOREIGN PATENT DOCUMENTS 0322029 6/1989 European Pat. Off.
2265227 10/1975 France.
2497041 6/1982 France.
61-273790 12/1986 Japan.

*Primary Examiner*—Douglas W. Olms
*Assistant Examiner*—Ajit Patel
*Attorney, Agent, or Firm*—Hill, Steadman & Simpson

[57] ABSTRACT

In packet-switching systems, there is the problem of time-interlacing or multiplexing the cell streams intended for a plurality of receiver LANs onto a single transmission line. A method is used for this in which output times for cells of the receiver are arranged in a cyclical time table and the cells intended for the receivers are allocated to these output times in accordance with their data rate. The basic cycle of the time table depends on the receiver having the lowest data rate. In order to handle collisions where cells for a plurality of receivers are to be transmitted at the same output time, in each case a stack store in which the cells are temporarily stored is allocated to the output times. The stack stores thus form a queue with respect to the output of the cells intended for the receivers. If it is determined during multiplexing that an stack store contains a plurality of cells, then the latter are transmitted one after the other until the stack store is empty.

18 Claims, 3 Drawing Sheets

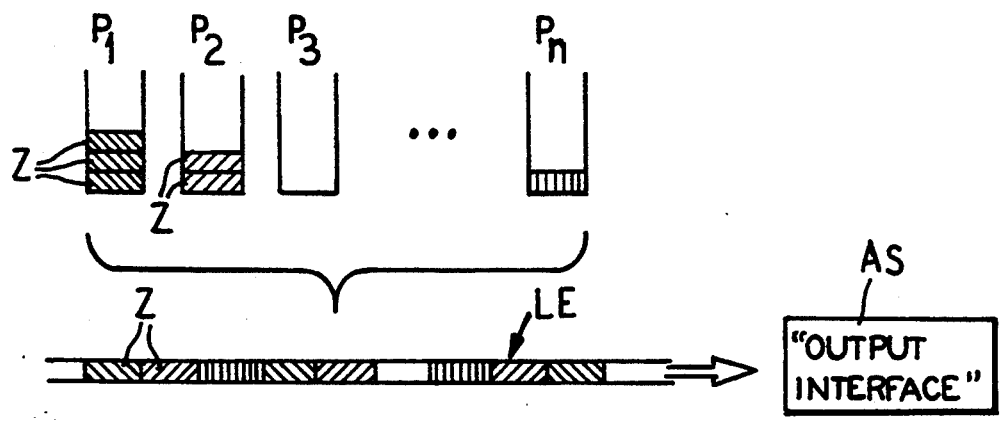
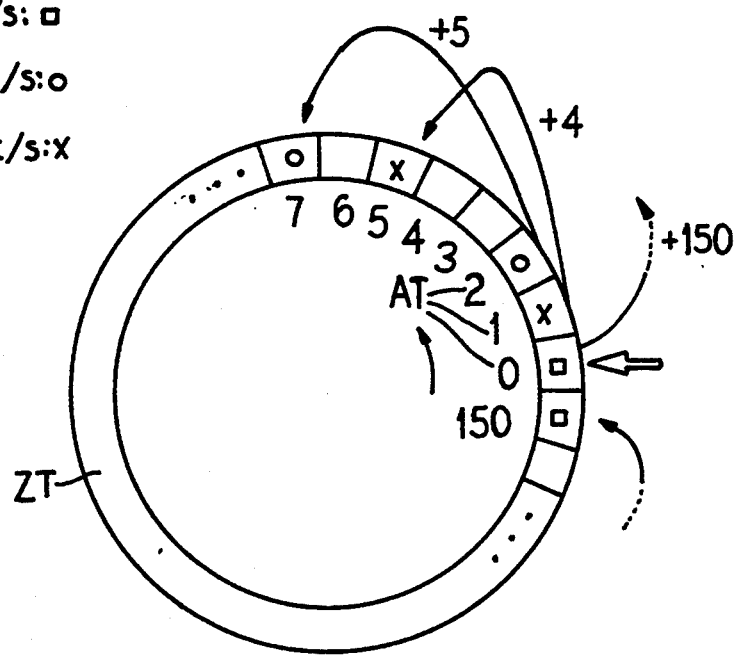

METHOD FOR MULTIPLEXING CELLS INTENDED FOR A PLURALITY OF RECEIVERS ONTO A TRANSMISSION LINE CONNECTED TO THE RECEIVERS

BACKGROUND OF THE INVENTION

In information-switching systems, for example packet-switching systems, at various points, for example switching computers, servers, etc., it is necessary to time-interlace or to multiplex the cell streams intended for a plurality of receivers onto a single transmission line. The cells are transported on the transmission line and subsequently split into cell streams intended for individual receivers again at distribution nodes. The following peripheral conditions exist here for the multiplexing:

The receivers frequently have different receiving data rates. Since the data rate on the transmission line is constant however, the different receiving data rates must already be taken into account during the multiplexing of the cell streams in the form of time intervals of different length between two cells intended for the same receiver.

The multiplexing must be carried out under real-time conditions.

It should be possible to perform the multiplexing even in the case of over-reservations. Although over-reservations are only seldom used at present, it is to be expected that over-reservations will be unavoidable in the near future. A multiplexing method which adjusts dynamically to the respective active transmitter/receiver configuration will then be required in such a situation.

SUMMARY OF THE INVENTION

The problem on which the invention is based is to disclose a method which fulfills the requirements stated above. The problem is solved in accordance with the method of the present invention for multiplexing cells intended for a plurality of receivers onto a transmission line connected to the receivers, wherein a cyclical time table is generated which is divided into output times at which cells can be transmitted, and wherein the transmission times for cells of the receivers are distributed to the output times of the time table in accordance with their data rate.

The terms used below are intended to have the following meaning:

Cell: Fixed-length information unit comprising header information, for example routing address, and a payload section. The cells are also referred to as information cells to better distinguish them from empty cells.

Empty cell: In packet-switching systems not all cells actually contain information intended for a receiver. The state where no information is to be transmitted is represented by empty cells.

Cell stream: A cell stream is a continuous sequence of information cells and empty cells.

Packet: This is understood to be one information unit in a LAN (local area network). Packets can be of variable length on LANs.

Packet transmission: In order to be able to transmit packets of varying sizes in packet-switching networks with fixed-length cells, at the transmitting LAN they are divided into a corresponding number of cells, provided with the address of the receiver in each case, and transmitted.

Data rate: Each LAN can receive and transmit data at a given data rate. In ATM networks, in which data is transmitted in the form of a cell stream, the transmission rate is however constant. The receiving or transmitting rate of a LAN does not refer to the transmission rate of the ATM network, but to the time-averaged rate resulting from the arrival times of cells for the same LAN. In order to obtain a lower data rate than the ATM network transmission rate, it is thus necessary to insert a corresponding number of empty cells between two information cells for the same LAN.

Over-reservations: The term "over-reservation" is understood to mean that the sum of the data rates of all transmitters or all receivers can exceed the maximum transmission rate of the ATM network. This is based on the idea that it is only relatively seldom that all the transmitters logged on will actually be transmitting something. The capacity of the transmission line can thus be better utilized by means of over-reservation.

By virtue of the method according to the invention, therefore, a plurality of concurrently arriving cell streams are interlaced or multiplexed under real-time conditions onto a single transmission line in such a way that, while maintaining defined minimum time intervals between the cells intended for the same receiver, an optimally favorable capacity utilization of the transmission line and also an optimally low storage requirement for buffering the individual cell streams are achieved.

The cyclical time table employed here has a basic cycle which is defined by the receiver having the lowest data rate. All other receivers having a higher data rate are then allocated to the output times in the time table in accordance with their data rate. The case may occur here that cells are to be transmitted for a plurality of receivers for a particular output time, that is to say there is a case of conflict. This case of conflict is resolved with the aid of the stack store, since one stack store that can buffer the cells of the competing receivers is allocated to each output time. If it is established that at a particular output time a plurality of cells are contained in the allocated stack store, then said cells are transmitted one after the other until the stack store is empty.

It is expedient that buffer memories are allocated to the individual receivers connected to the transmission line in the transmitter circuit, in which buffer memories the cells to be transmitted to the receivers are temporarily stored. If this is the case, then it is advantageous if the stack stores do not contain the cells themselves, but rather a pointer to the buffer memories in which the cells are stored.

Other further developments of the invention are as follows. The time table has a basic cycle defined by the a receiver having the lowest data rate. Stack stores are allocated to the output times, in which stack stores the cells to be transmitted are stored if cells for a plurality of receivers are to be transmitted at the output time (case of conflict), and wherein cells contained in a stack store are transmitted one after the other. In case of conflict the cells of a stack store are transmitted one after the other at successive output times until the stack store is empty. In the event of collisions the stack stores contain addresses pointing to the buffer memories allocated to the receivers. The stack stores operate according to the LIFO principle. The number of memory words per stack store is the number of different data rates of receivers connected to a transmission line plus one memory word for a new entry. The basic cycle is formed from the time interval of the cells for the receiver having the lowest data rate plus the number of memory words per stack plus one. An output pointer, which points to the an outputting stack store, and an active pointer, which points to the output time of the time table, are provided. The output pointer points to a stack store as long as the latter contains entries for cells, while the output pointer moves on in the time table. The output pointer and active pointer point to the same output time of the time table when the stack store is empty. When a new receiver is inserted into the time table, the step distance is determined from the data rate of this receiver. The first output time of a cell for this receiver is calculated from the a position of the current pointer plus the step distance. A receiver is removed from the time table when the allocated receiver buffer memory is empty.

The transmission times for cells of a receiver follow at a fixed step distance, the step distance being the time which must elapse for a particular receiver after the output of a cell until a cell may be transmitted again to this receiver.

The step distance for a receiver is variable.

Given the presence of receivers having the same data rate, the stack stores allocated to the output times of the time table are enlarged by a number of memory words corresponding to the number of receivers having the same data rate.

For supporting group addressing, the LAN packets are stored in a common store. Pointers to the LAN packets are stored in buffer memories allocated to the receivers when a corresponding LAN packet is to be forwarded to the allocated receiver.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

FIG. 1 shows a diagrammatic representation of the multiplexing method,

FIG. 2 shows a diagrammatic representation of the time table used in the multiplexing method.

DESCRIPTION OF THE PREFERRED EMBODIMENT

Figure 3:
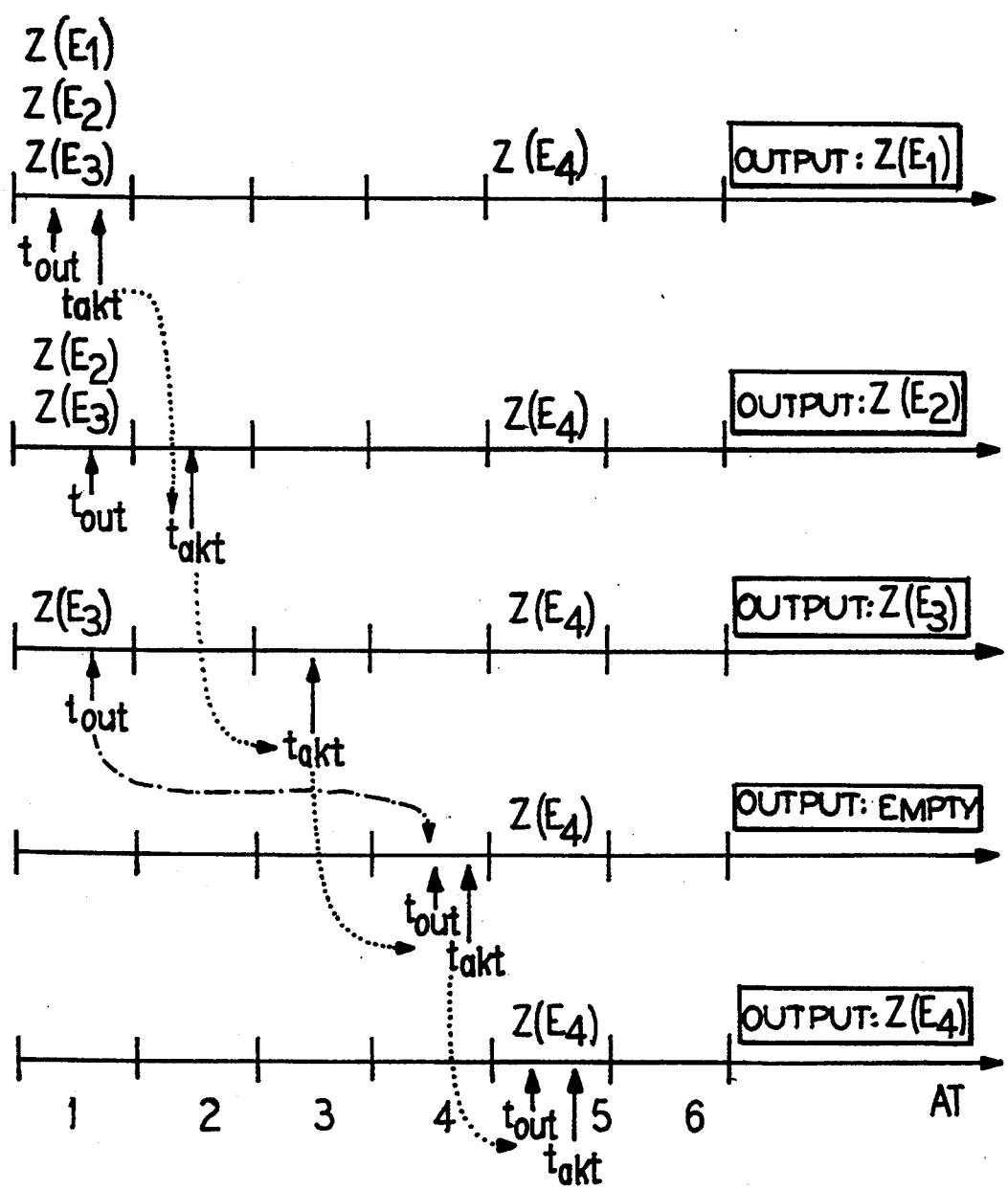
FIG. 3 shows how collisions are handled.

According to FIG. 1, in each case a buffer memory P is allocated to each receiver E in the transmitting area. Assuming that n receivers are supplied with cells for one transmission line, n buffer memories Pn are required. The cells to be transmitted to the allocated receivers are temporarily stored in these buffer memories P1 to Pn, as is shown by way of example in FIG. 1. The cells contained in the buffer memories P1 to Pn must now be transmitted over the transmission line LE. For this purpose, they are time-interlaced or multiplexed onto the transmission line LE, as is shown diagrammatically in FIG. 1. Cell streams then proceed on the transmission line LE to an output interface AS, which distributes the cells to the allocated receivers again.

In order not to waste storage space in the buffer memories unnecessarily, it is expedient if, in the case of the incoming data streams supplied from channels, the empty cells are already removed and only information cells are then temporarily stored in the buffer memories.

The multiplexing method is based then on a cyclical time table ZT, which is illustrated in FIG. 2, in which output times AT of cells to their receivers are managed in a suitable manner. Any collisions that occur here, for example cells are to be transmitted to more than one receiver at one time, are handled by temporary storage in a stack store.

The description of the multiplexing method starts from a switching system in which a data rate is allocated to each receiver. For example, six different data rates may exist here, as Table 1 shows. The data rates specified in Table 1 have however no influence on the basic execution of the method, but rather serve only for its illustration.

TABLE 1

| F1 Data rate (Mbit/s) | F2 Time interval (inf. unit) | F3 Rounded time interval | F4 Achievable data rate (Mbit/s) |
|---|---|---|---|
| 1 | 150 | 150 | 1 |
| 2 | 75 | 75 | 2 |
| 4 | 37.5 | 38 | 3.95 |
| 10 | 15 | 15 | 10 |
| 34 | 4.4 | 5 | 30 |
| 44 | 3.4 | 4 | 37.5 |

Table 1: Sample data rates and time intervals

The data rate is given in megabits per second in the first field of Table 1, the time interval or the step distance is given in information units or cells in the second field F2, the rounded time interval is given in information units or cells in field F3, and the data rate that can be achieved for the rounded time interval according to field F3 is given in field F4.

During the sequentialization on the transmission line, the data rates from Table 1 must be generated by the multiplexing method in such a way that after the transmission of an information unit or cell to a receiver, no further information unit or cell is transmitted to this receiver for a time corresponding to the data rate thereof. This time, also termed step distance, is the quotient of the assumed basic system data rate of 150 megabits per second and the data rate of the receiver. It can also be seen from Table 1 that it is not always possible for the data rates to be realized well by the fixed time intervals of the time table. If no short-term exceeding of the data rates is possible (so-called bursts), the required time intervals must first be rounded up to the higher integer value. This can be seen in field F4 in comparison with field F2.

The time intervals (step distance) required, that is to say the time which must elapse after output of a cell for a particular receiver until a cell may be transmitted to this receiver again, can be seen from Table 1. It can also be seen from this table when the next cell may be transmitted for a particular receiver. This time is termed the transmission time of the cell in the text below.

The transmission times for the individual receivers can now be defined with the aid of the time table according to FIG. 2.

The cyclical time table is divided into output times, these being the times at which a cell can be multiplexed onto the transmission line. The maximum number of output times is defined by the basic cycle of the time table, which depends on the lowest data rate of the receivers. In our example this is the receiver E1, which has a transmission rate of 1 Mbit/s. Assuming that the basic system transmission rate is 150 Mbit/s, 150 cells can be transmitted in a basic cycle. After transmitting a cell, the receiver E1 having the lowest data rate must therefore wait for at least 149 other cells until it can receive a cell again. Since this is the slowest class, the time table must have a queue comprising at least 150 entries.

FIG. 2 diagrammatically illustrates a cyclical time table which is divided into 150 output times AT (1 to 150). Cells are output to three receivers E1 to E3, the receiver E1 having a data rate of 1 Mbit/s, the receiver E2 having a data rate of 34 Mbit/s and the receiver E3 having a data rate of 44 Mbit/s. This allocation of the output times of the time table to the transmission times for the receivers E1 to E3 is indicated. According to Table 1, the receiver E1 has a step distance of 150, the receiver E2 has a step distance of 5 and the receiver E3 has a step distance of 4. The transfer times are shown for two transmission times in each case. The receiver E2 receives a cell at the output time two and at the output time seven in each case, and the receiver E3 receives a cell at the output time one and at the output time five in each case.

It can also be seen from FIG. 2 that difficulties arise when, for example, the starting points for the receiver two and for the receiver three are swapped. In this case, namely, in each case one cell for the receiver E2 and for the receiver E3 coincide at the output time six. A collision is thus present, since cells for both receivers E2 and E3 would need to be output at the output time 6.

In order to handle collisions, the principle is extended in such a way that now not just the entry of a cell for an output time is possible. Instead, a stack store which can accommodate the colliding cells is allocated to every output time. The resulting structure is thus a queue of stack stores, the entries of which represent pointers to the buffer memories P1 to Pn according to FIG. 1. When the method is executed, in the event of collisions the top memory word of the stack store is output and subsequently the further entries in the stack store are output at the following output times. The size of the individual stack stores depends on the number of data rates offered by the system. The different data rates have the effect that, in the most unfavorable case starting from n different times (n=different data rates; n=6 in the example), receiver numbers with different step distances are entered for the same output time.

Thus, in the exemplary embodiment one stack store size having a number of storage locations for six entries plus one entry for new entries for the stack store must be provided for each output time. Simulations have however shown that typically only two to three receivers are involved in a collision. The majority of the stack store thus serves as a safety reserve.

The manner in which cases of conflict are handled will be discussed with reference to FIG. 3. FIG. 3 shows six output times. It is assumed that cells Z for three receivers E1, E2, E3 are present in the allocated stack store at the output time 1, while no cells have to be transmitted at output times 2, 3, 4, and again on the other hand one cell Z is to be output for the receiver E4 at the output time 5. There is therefore a case of conflict at output time E1, since three receivers E1 to E3 could be supplied with cells. Said cells are now multiplexed onto the transmission line in accordance with the following method, two pointers takt and tout being used for the purposes of explanation. The pointer takt indicates which output time AT is present, and the pointer tout points to the stack store from which the cells are taken. In the course of the method, the amount of the two pointer values can vary at a maximum by the value of the stack store size constant. This means that the example of FIG. 2 is varied in such a way that the basic cycle now no longer corresponds to the step distance of the receiver having the lowest data rate, but rather the basic cycle is defined as the step distance of the receiver having the lowest data rate plus stack store size plus 1. If the stack store size were to be omitted, then errors could subsequently arise when cells are switched onwards for receivers having the lowest data rate, which would result in premature renewed transmission of cells to said receiver.

Stack stores can be used to handle collisions. It is of course also possible to realize the stores as FiFo stores. However, stack stores are more advantageous. A collision means that a number of cells could be output at the same time to receivers having the same or different data rates, In principle it does not matter which of these receivers is selected. However, the receivers having a high data rate generally expect a large data volume, so that it is expedient to give priority to these receivers. A FiFo however does exactly the opposite. In this case the cells are output first of the receivers that were also entered first. These are the receivers having the greatest step distance, that is to say those having the lowest data rate. In contrast, a stack store operating according to the LiFo principle ensures that cells for receivers having a short step distance, that is to say high data rate, which are entered last are output again first.

The use of a stack store increases throughput by approximately 3%.

The collision handling can be explained with the assistance of the two pointers tout and takt. If there is no collision, the pointers tout and takt always point to the same stack store in the queue in accordance with the time table. If a collision occurs, the pointer tout waits until the stack store has been processed completely and then attempts to catch up with the pointer takt again. A collision exists at output time 1 according to FIG. 3. Three cells are present for three different receivers E1 to E3 in the stack store allocated to the output time 1. The pointers tout and takt initially point to the same stack store, that is to say the transmission time of the cell Z(E1) coincides with the output time 1. The cell Z(E1) is accordingly output onto the transmission line. The pointer takt subsequently moves on to the next output time 2, while the pointer tout points to the stack store for the output time 1. The cell Z(E2) for the receiver is now output onto the transmission line at the output time 2. Analogously, the cell Z(E3) for the receiver E3 is transferred at the output time 3. The stack store for the output time is consequently empty and the pointer tout now also branches like the pointer takt to the output time 4. However, the stack store for the output time 4 does not contain any cells, so an empty cell is output. Only at output time 5 does the allocated stack store contain a cell for the receiver E4, and accordingly outputs this cell for the receiver E4 onto the transmission line.

With this method, a gap in the cell stream only occurs if both pointers have the same value and the allocated stack store is empty. If the sum of the individual receiver data rates cannot exceed the transmission capacity of the ATM network, it is ensured that the pointer tout soon catches up with the pointer takt, since a collision can be interpreted as an increased data output rate at one point in time, which must necessarily then be compensated at another, later time by a corresponding low data rate.

An improvement of the output performance is additionally achieved as a result of the introduction of the pointer tout. Whereas there was no other way of outputting an empty cell in the overview arrangement of FIG. 2 at the times 3 and 4 at which no cells were present for a receiver that was ready to receive, with the solution extended to include stack stores it is possible to fill such gaps by entries from the stack stores if necessary.

If cells are made available for a receiver which was hitherto not involved in the process, it is necessary to insert the new receiver into the time table. The insertion takes place with the assistance of the step distance of the new receiver. It is expedient here to define the first interrogation time in the form takt plus step distance of the new receiver, that is to say not transmit a cell of the new receiver immediately at the current time takt, but rather delayed by the step distance of the new receiver.

Once the last cell of a packet comprising a plurality of cells has been output, it is always possible that the receiver buffer P has consequently been completely emptied. It must therefore be checked whether there are still further entries in the buffer memory associated with the respective receiver. If this is the case, then the cell can be transmitted in the usual manner. If, on the other hand, the buffer memory is empty, then the latter is no longer interrogated, since no reference to the buffer memory can then be present in the stack stores. Only when cells for this receiver are to be transmitted is it necessary to ensure by a new entry in the manner described above that a reference to the buffer memory is entered in the stack store allocated to the output time defined by the step distance of the receiver plus takt. This way of handling empty buffer memories and the activation of a previously unused receiver permits automatic adjustment of the method to the variable active transmitter configurations for supporting over-reservation.

It can be seen from Table 1 that not all desired data rates with fixed integer time intervals can be realized satisfactorily. Losses are evident with data rates 34 and 44 Mbit/s.

So-called bursts, that is to say brief exceeding of the data rates, can be of assistance here. With the previous method with permanent identical time intervals of the time table, it is guaranteed that the data rate resulting from the time interval of two cells does not—even briefly—exceed the desired data rate. If, however, the time interval of a plurality of successive cells may vary, which corresponds to brief exceeding of the data rate, then it is also possible to approximate less favorable data rates well.

Only the step distance of the corresponding receiver need be modified for this purpose. This function may now no longer only supply a fixed value for the respective data rate, but rather this value is cyclically varied. Table 2 shows sequences of time intervals that produce a better approximation of the desired data rate for the critical classes of data rates according to Table 1.

TABLE 2

| Data rate (Mbit/s) | Time interval (inf. unit) | Rounded time interval | Achiev. data rate (Mbit/s) | Sequence of time intervals (inf. unit) | Data rate during bursts (Mbit/s) |
|---|---|---|---|---|---|
| 1 | 150 | 150 | 1 | 150 | 1 |
| 2 | 75 | 75 | 2 | 75 | 2 |
| 4 | 37.5 | 38 | 3.95 | 38/37 | 4 |
| 10 | 15 | 15 | 10 | 15 | 10 |
| 34 | 4.4 | 5 | 30 | 5/4 | 33.75 |
| 44 | 3.4 | 4 | 37.5 | 4/3 | 43.75 |

Figure 4:
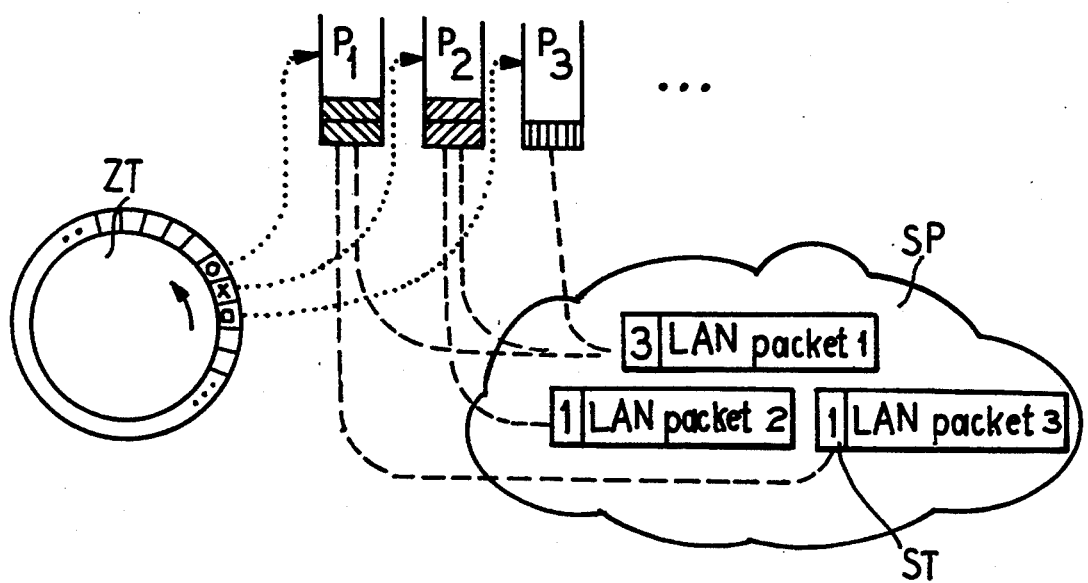
FIG. 4 shows the data structure for supporting group addressing.

Group addressing is frequently offered as a further service in packet-switching systems. With group addressing, the information units or cells of a transmitter are sent to a plurality of receivers. When group addressing is supported, the dimensioning of the stack stores and the entry of a cell in the stack store must be modified. For realizing group addressing, the group is split into the individual receivers and the message is entered in a plurality of receiver buffer memories. In order to save storage space, in the version of the multiplexing method extended for group addressing a new storage location is not requested for every copy of a cell to a receiver in each case, but rather the complete packet is collected in a store and provided with a counter which indicates to how many receivers the packet is to be sent. Only a pointer to the common store is entered in the respective receiver buffer memories. FIG. 4 shows this solution. Three LAN packets PK1, PK2, PK3 are shown, which are stored in a common store SP. It is indicated whether the packet is intended for one or more receivers in the storage location ST in each LAN packet.

In the case of group addressing, the method for entering the cells in the receiver buffer memory must therefore not only duplicate the pointer to the packet, but it must also call up the process for entering a previously unused buffer memory in the time table several times. This results in a second modification for supporting group addressing. Since all receivers addressed with group addressing are in the same data rate class, the stack stores of the time table must also be able to accommodate a number of entries corresponding to the maximum group size at any one time. The stack store size is therefore to be changed from (6+1) in the exemplary embodiment of Table 1 to 6+maximum group size. Given a typical maximum group size of 16 receivers, therefore, this produces a stack size of 22 memory words for 22 entries.

The relationships with group addressing can be seen from FIG. 4. The allocation of the time table ZT with the output times to the buffer memories P1 to P3 is performed in the manner described above. In contrast, references to the LAN packets stored in the store SP are present in the buffer memories P1 to P3. It can be seen that, for example, the packet PK1 is intended for three receivers, namely the receivers E1 to E3. Accordingly, there are pointers in the buffer memories P1 to P3 which point to the LAN packet PK1. At the time of occurrence, for example for the buffer memory P1, the first cell of the packet PK1 is then transmitted on the transmission line.

The invention is not limited to the particular details of the method depicted and other modifications and applications are contemplated. Certain other changes may be made in the above described method without departing from the true spirit and scope of the invention herein involved. It is intended, therefore, that the subject matter in the above depiction shall be interpreted as illustrative and not in a limiting sense.

What is claimed is:

1. A method for multiplexing cells intended for a plurality of receivers onto a transmission line connected to the receivers, comprising the steps of:
generating a cyclical time table which is divided into output times at which cells can be transmitted;
allocating stack stores to the output times, in which stack stores the cells to be transmitted are stored when cells for a plurality of receivers are to be transmitted at a respective output time of the output times;
providing an output pointer, which points to an outputting stack store of the stack store, and providing an active pointer, which points to the respective output time of the time table, the output pointer pointing to the outputting stack store as long as entries for cells are contained therein, and when no cells are contained in the outputting stack store the output pointer moving on in the time table such that the output pointer and the active pointer indicate one and the same output time of the time table when the outputting stack store is empty.

2. The method as claimed in claim 1, wherein the time table has a basic cycle defined by a receiver having the lowest data rate.

3. The method as claimed in claim 1, wherein, when a conflict occurs when cells for a plurality of receivers are to be transmitted at the respective output time, the cells of a stack store are transmitted one after the other at successive output times until the stack store is empty.

4. The method as claimed in claim 1, wherein, when a conflict occurs, the stack stores contain addresses pointing to buffer memories allocated to the receivers.

5. The method as claimed in claim 1, wherein the stack stores operate according to a last-in-first-out principle.

6. The method as claimed in claim 5, wherein a number of memory words per stack store consists of a number of different data rates of receivers connected to the transmission line plus one memory word for a new entry.

7. The method as claimed in claim 6, wherein a basic cycle is formed from a time interval of the cells for the receiver having the lowest data rate plus the number of memory words per stack plus one.

8. The method as claimed in claim 1, wherein when a new receiver is inserted into the time table, a step distance is determined from the data rate of the new receiver, and a first output time of a cell for the new receiver is calculated from a position of the active pointer plus the step distance.

9. The method as claimed in claim 8, wherein a receiver is removed from the time table when an allocated receiver buffer memory is empty.

10. The method as claimed in claim 1, wherein the transmission times for cells of a receiver follow at a fixed step distance, the step distance being a time which must elapse for a respective receiver after output of a cell until a cell is transmitted again to the respective receiver.

11. The method as claimed in claim 1, wherein a step distance for a receiver is variable.

12. The method as claimed in claim 1, wherein, given a number of receivers having the same data rate, the stack stores allocated to the output times of the time table are enlarged by a number of memory words corresponding to the number of receivers having the same data rate.

13. The method as claimed in claim 1, wherein, for supporting group addressing, LAN packets are stored in a common store, and wherein pointers to the LAN packets are stored in buffer memories allocated to the receivers when a corresponding LAN packet is to be forwarded to the allocated receiver.

14. A method for multiplexing cells intended for a plurality of receivers onto a transmission line connected to the receivers, at least some of the receivers having different data rates, comprising the steps of:
generating a cyclical time table which is divided into output times at which cells can be transmitted, the time table having a basic cycle defined by a receiver having the lowest data rate;
allocating stack stores to the output times, in which stack stores the cells to be transmitted are stored when cells for a plurality of receivers are to be transmitted at a respective output time of the output times, cells contained in a respective stack store being transmitted one after the other;
operating the stack stores according to a last-in-first-out principle, a number of memory words per stack store consisting of a number of different data rates of receivers connected to the transmission line plus one memory word for a new entry;
forming a basic cycle from a time interval of the cells for the receiver having the lowest data rate plus the number of memory words per stack plus one;
providing an output pointer, which points to an outputting stack store of the stack stores, and an active pointer, which points to the respective output time of the time table, the output pointer pointing to the outputting stack store as long as entries for cells are contained therein, and when no cells are contained in the outputting stack store the output pointer moving on in the time table such that the output pointer and the active pointer indicate one and the same output time of the time table when the outputting stack store is empty.

15. The method as claimed in claim 14, wherein when a new receiver is inserted into the time table, a step distance is determined from the data rate of the new receiver, and a first output time of a cell for the new receiver is calculated from a position of the current active pointer plus the step distance.

16. The method as claimed in claim 15, wherein a receiver is removed from the time table when an allocated receiver buffer memory is empty.

17. The method as claimed in claim 14, wherein the transmission times for cells of a receiver follow at a fixed step distance, the step distance being a time which must elapse for a respective receiver after output of a cell until a cell may be transmitted again to the respective receiver.

18. The method as claimed in claim 14, wherein a step distance for a receiver is variable.

* * * * *